(12) United States Patent
Avinash

(10) Patent No.: US 7,206,460 B2
(45) Date of Patent: Apr. 17, 2007

(54) METHOD FOR CONTRAST MATCHING OF MULTIPLE IMAGES OF THE SAME OBJECT OR SCENE TO A COMMON REFERENCE IMAGE

(75) Inventor: Gopal B. Avinash, New Berlin, WI (US)

(73) Assignee: General Electric Company, Schnectady, NY (US)

( * ) Notice: Subject to any disclaimer, the term of this patent is extended or adjusted under 35 U.S.C. 154(b) by 727 days.

(21) Appl. No.: 09/682,934

(22) Filed: Nov. 1, 2001

(65) Prior Publication Data

US 2003/0081820 A1    May 1, 2003

(51) Int. Cl.
*G06K 9/00* (2006.01)
(52) U.S. Cl. .................. 382/274; 382/131; 382/278; 348/251; 348/252; 345/611; 345/617; 358/461
(58) Field of Classification Search ............... 382/131, 382/274, 205, 278, 264; 345/617, 611; 348/251, 348/252; 358/461
See application file for complete search history.

(56) References Cited

U.S. PATENT DOCUMENTS 5,974,113 A * 10/1999 Bruijns et al. ............ 378/98.7
6,080,107 A * 6/2000 Poland ...................... 600/458
6,132,377 A * 10/2000 Bolorforosh et al. ....... 600/458
6,178,268 B1 * 1/2001 Furukawa et al. .......... 382/260
6,807,299 B2 * 10/2004 Sobol ........................ 382/166

FOREIGN PATENT DOCUMENTS

JP    10-198801    *   7/1998
JP    11-111795    *   4/1999

* cited by examiner

*Primary Examiner*—Matthew C. Bella
*Assistant Examiner*—Shefali Patel
(74) *Attorney, Agent, or Firm*—Peter J. Vogel

(57) ABSTRACT

A method of imaging and a system therefore are provided. The imaging system includes an image forming device for generating a first image and a second image and a controller coupled to the image forming device. The controller receives the first image and the second image. In the method the controller generates an image ratio of the first image and the second image, regularizes the image ratio of the second image with respect to the first image to form a regularized image ratio and filters the image ratio to form a filtered ratio. The controller then multiplies the second image by the filtered ratio to form an adjusted image.

18 Claims, 2 Drawing Sheets

METHOD FOR CONTRAST MATCHING OF MULTIPLE IMAGES OF THE SAME OBJECT OR SCENE TO A COMMON REFERENCE IMAGE

BACKGROUND OF INVENTION

The present invention relates generally to image systems and, more particularly, to matching the contrast of multiple images from the image system.

Many types of digital imaging systems are known. In the medical field, such systems may include CT systems, X-ray system and MRI systems. In each case multiple digital images may be formed of the same scene or object. The multiple images may be generated using the same input with different parameter sets. In many circumstances there exists a need to evaluate which of these images are optimal so that the appropriate parameters can be obtained. However, the problem with such images is that the brightness and contrast are different. Thus, the images have to be mentally normalized. That is, brightness and contrast differences must be overlooked by the evaluator. This kind of normalization may lead to subjective bias and takes the mind of the evaluator away from the parameter evaluation.

Image processing algorithms are available in which different parameter choices produce different looks. For example, one set of parameters yields improved smoothness but produces artificially bright undesirable regions. The other set of parameters produces noisy images but without bright regions. Adjusting each image individually is time consuming and may yield inconsistent results.

It would be desirable to match the brightness and contrast of various types of images such as smooth images and noise images to produce resultant images that are smooth but not artificially bright in one region. Also, there exists a need to match images of the same scene taken at multiple time points such that they can be displayed with the same brightness and contrast.

SUMMARY OF INVENTION

The present invention provides image processing that may be used with various types of imaging systems to reduce variability in brightness and contrast between different images.

In one aspect of the invention, a method of contrast matching a first image and a second image comprising: generating an image ratio of the first image and the second image; regularizing an image ratio of the second image with respect to the first image to form a regularized image ratio; filtering the image ratio to form a filtered ratio; and multiplying the second image by the filtered ratio to form an adjusted image.

In a further aspect of the invention, an imaging system includes an image forming device for generating a first image and a second image and a controller coupled to the image forming device. The controller receives the first image and the second image. The controller generates an image ratio of the first image and the second image, regularizes the image ratio of the second image with respect to the first image to form a regularized image ratio and filters the image ratio to form a filtered ratio. The controller then multiplies the second image by the filtered ratio to form an adjusted image.

One advantage of the invention is that the subjective nature of viewing images having different contrast and brightness portions is reduced. Another advantage is that the process can be automated so that once a first or reference image is chosen a number of images can be matched to the reference image quickly.

Other aspects and advantages of the present invention will become apparent upon the following detailed description and appended claims, and upon reference to the accompanying drawings.

DETAILED DESCRIPTION

While the following description is provided with respect to an X-ray device, the present application may be used with various types of imaging systems in both medical and non-medical related fields. In the medical field, the present invention may be incorporated into, but is not limited to, a CT system, an MRI system, and an ultrasound system.

Figure 1:
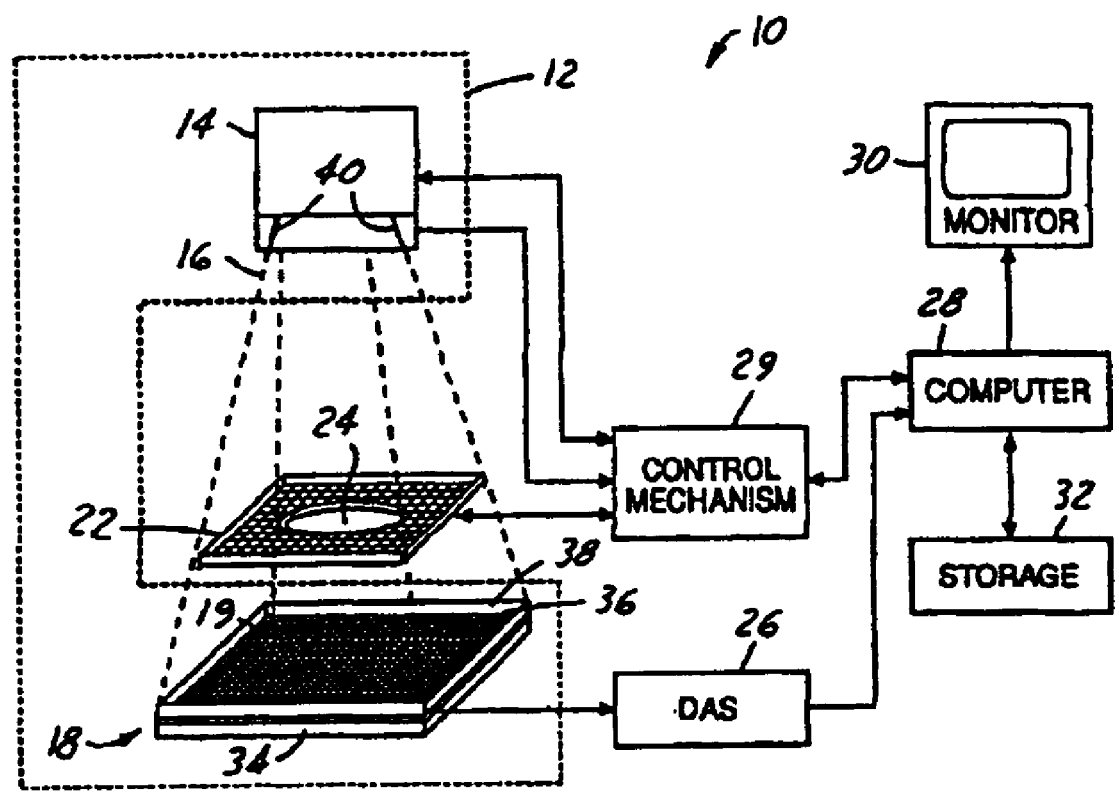
FIG. 1 is a schematic illustration of an image system in accordance with a preferred embodiment of the present invention.

Referring to FIG. 1, an imaging system 10 in accordance with the present invention is shown. The imaging system 10 preferably includes a housing 12 containing an x-ray source 14 or other type of image generating source. The housing 12 may be a gantry having the ability for movement in multiple directions. The x-ray source 14 projects a beam of x-rays 16 towards a detection array 18, which may also be contained within the housing 12. Positioned in between the x-ray source 14 and the detection array 18 is a table 22, preferably not within housing 12, for holding an object 24 to be imaged by the imaging system 10. A data acquisition system (DAS) 26 registers signals from the detection array 18 and sends the information to a computer controller 28 for image processing. Controller 28 is preferably a microprocessor-based personal computer. A control mechanism 29 may be used to control the movement and position of the system components as well as power and timing signals to the x-ray source 14.

The imaging system 10 may also include a monitor 30 and storage medium 32 for viewing and storing information. While electronic and control mechanism are illustrated, they are not required to perform the imaging techniques described herein and are merely being shown for illustration purposes only.

Although such a system describes generically an imaging system, the present invention preferably utilizes a high-resolution imager. The imager has a pixel location and dimension of a high order of magnitude precision. Thus, each image will have multiple pixels in the image that will be covered by the shadow of the object. These multiple pixels can then be mathematically evaluated to calculate either a size or position that has a degree of precision that is a small fraction of the dimension of any one pixel. High-resolution imagers are well known in the prior art.

The detection array 18, on such high-resolution systems, includes a plurality of pixel panels 19, although a variety of pixel panel 19 shapes, sizes and densities are contemplated. In addition, it is required that variations in pixel size and location be minimized. A variety of detection arrays 18 includes a glass substrate 34, a photodetector array 36 and a scintillator 38. In other embodiments, however, alternative detection array 18 configurations are contemplated.

Figure 2:
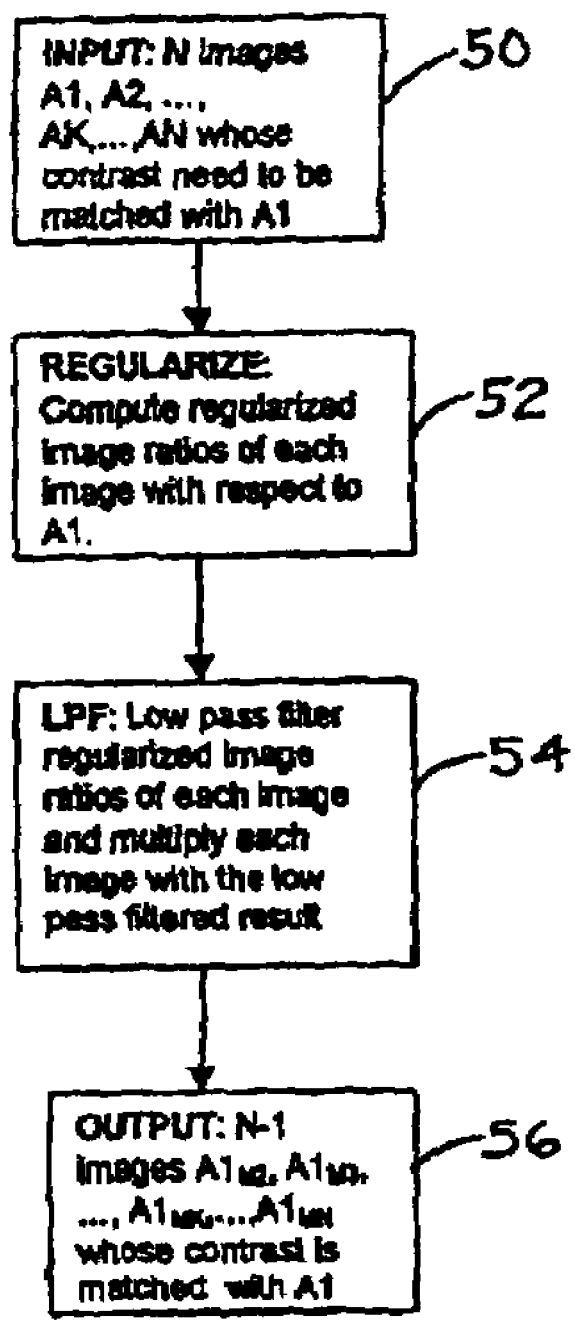
FIG. 2 is a flow chart for image processing according to the present invention.

Referring now to FIG. 2, the imaging processing is described. In step 50, images that are desired to be imaged matched are stored into the system. This may be done at one time or over a period of time. As mentioned above, this may be performed using various types of imaging devices. The process described below pertains to two images. The same process may be used for multiple images in a similar manner as will be described below.

In this example two images A1 and A2 of the same object or scene are to be imaged matched A2 to A1. For every pixel of A1 and A2 the following relation holds:

$$A1 = A2 * (A1/A2).$$

By differentiation of the logarithm of above equation, the contrast function C(.) at a given location is denoted by:

$$C(A1) = C(A2) + C(A1/A2).$$

As will be further described below, the image division A1/A2 may optionally be regularized relative to the image to be matched A1 in step 52 when the image quality is not good e.g. noisy. Various types if regularization may be performed. Regularization will be further described below.

In order to satisfy C(A1)=C(A2) in the above equation. C(A1/A2)=0. A well known way to decrease the contrast is to low pass filter the ratio A1/A2 as shown in step 54. Therefore in step 56, contrast matching output equation for the two images A1 and A2 is thus:

$$A1_{M2} = A2 * LPF(A1/A2).$$

where $A1_{M2}$ is the contrast matched version of A2 with respect to A1 and LPF(.) is a low pass filter function. The low pass filter function is further described below.

For multiple (N) images. Let A1, A2, ... AK ... AN be the N images under consideration (K<N) and each of these images are to be matched to the same reference image A1. By extending the above logic to any of N images, say image K, the general relationship exists.

$$A1_{MK} = AK * LPF(A1/AK)$$

where $A1_{MK}$ is the contrast matched version of AK with respect to A1. Thus, a generalized contrast matching has been achieved since. $C(A1) = C(A1_{M2}) = \ldots = C(A1_{MK}) = \ldots = C(A1_{MN})$.

The choice of parameters in the low pass filter function essentially determines the scale of contrast matching obtained. Various types of low pass filters may be used. For example, a boxcar filter with a single parameter may be used. A boxcar filter smoothes an image by the average of a given neighborhood of pixels. It is separable and efficient methods exist for its computation. Each point in the image requires just four arithmetic operations, irrespective of the kernel size. The length of the separable kernel is variable and depends on the scale of contrast matching desired. For example, if the kernel size is about one tenth of the image size, assuming a square image and a square kernel, excellent global contrast matching of images is obtained. On the other hand, using too small a kernel size produces undesirable blobby patterns in the matched images. Therefore, a reasonably large kernel should be used to avoid any perceptible artifacts using this method.

To summarize, an image A2 has to be matched to another image A1 of the same scene/objects to obtain the matched image $A1_{M2}$ using the relation:

$$A1_{M2} = A2 * LPF(A1/A2)$$

where LPF is a low pass filter function. Preferably the low pass filter function is a boxcar filter and the parameters of the filter are application specific. For general applications, the filter kernel length is one-tenth the length of the image (assuming a square image and square kernel). Furthermore, in practice, the above equation may need to be modified in order to avoid noise amplification during image division. Regularization may be performed in a number of methods to prevent noise amplification during image division. The image division ratio has a numerator A1 and a denominator A2. One method to regularize image division is to add a small constant to the denominator i.e. denominator becomes A2+ϵ, where as an example, ϵ=1.0. Thus the equation becomes $$A1_{M2} = A2 * LPF(A1/(A2+\epsilon)).$$

Of course, if no regularization is to be performed, ϵ would be 0.

Another method for regularization is to replace the ratio (A1/A2) by a regularized ratio given by (A1*A2/(A2*A2+δ)), where as an example, δ=1.0. Thus the equation becomes $$A1_{M2} = A2 * LPF(A1 * A2/(A2 * A2 + \delta)).$$

When a number of images A2, ..., AK, ..., AN have to be matched to a single image A1, the above process may be performed in a pair wise fashion to obtain $A1_{M2}, \ldots, A1_{MK}, \ldots, A1_{MN}$.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

The invention claimed is:

1. A method of contrast matching a first image and a second image, said method comprising the steps of:
    (a) operating a controller to generate an image ratio of said first image and said second image, wherein said image ratio has a numerator representing said first image and a denominator representing said second image;
    (b) operating said controller to regularize said image ratio by adding a constant to said denominator to form a regularized image ratio;
    (c) operating said controller to filter said regularized image ratio to form a filtered ratio; and
    (d) operating said controller to multiply said second image by said filtered ratio to form an adjusted image having a contrast that better matches the contrast of said first image as viewed on a monitor.

2. A method as recited in claim 1, wherein step (c) is at least partially accomplished by operating said controller to execute a low-pass filter function.

3. A method as recited in claim 2, wherein said low-pass filter function is a boxcar type filter function.

4. A method as recited in claim 1, wherein step (b) further comprises operating said controller to multiply said numerator by said second image and also multiply said denominator by said second image before adding said constant to said denominator.

5. A method as recited in claim 1, wherein step (d) is accomplished so that said adjusted image is substantially contrast matched to said first image.

6. A method as recited in claim 1, wherein step (d) is accomplished so that said adjusted image is substantially brightness matched to said first image.

7. A method as recited in claim 1, wherein step (d) is accomplished so that said adjusted image is substantially both contrast matched and brightness matched to said first image.

8. A method as recited in claim 1, wherein said controller comprises at least one computer.

9. A method of operating a digital imaging system having an image forming device coupled to a controller with a monitor, said method comprising the steps of:
   (a) operating said image forming device to generate a first digital image;
   (b) operating said image forming device to generate a second digital image; and
   (c) operating said controller to match said second digital image to said first digital image by
   (i) generating an image ratio of said first digital image and said second digital image, wherein said image ratio has a numerator representing said first digital image and a denominator representing said second digital image;
   (ii) regularizing said image ratio to form a regularized image ratio;
   (iii) filtering said regularized image ratio to form a filtered ratio; and
   (iv) multiplying said second digital image by said filtered ratio to form an adjusted image that better matches said first digital image as viewed on said monitor.

10. A method as recited in claim 9, wherein sub-step (iii) is at least partially accomplished by executing a low-pass filter function.

11. A method as recited in claim 10, wherein said low-pass filter function is a boxcar type filter function.

12. A method as recited in claim 9, wherein sub-step (ii) is at least partially accomplished by multiplying said numerator by said second digital image, multiplying said denominator by said second digital image, and adding a constant to said denominator.

13. A method as recited in claim 9, wherein sub-step (iv) is accomplished so that said adjusted image is substantially contrast matched to said first digital image.

14. A method as recited in claim 9, wherein sub-step (iv) is accomplished so that said adjusted image is substantially brightness matched to said first digital image.

15. A method as recited in claim 9, wherein sub-step (iv) is accomplished so that said adjusted image is substantially both contrast matched and brightness matched to said first digital image.

16. An imaging system comprising:
   an image forming device far generating a first image and a second image; and
   a controller coupled to said image forming device for receiving said first image and said second image:
   wherein said controller is operable for (i) generating an image ratio of said first image and said second image, said image ratio having a numerator representing said first image and a denominator representing said second image; (ii) regularizing said image ratio by adding a constant to said denominator to form a regularized image ratio; (iii) filtering said regularized image ratio to form a filtered ratio; and (iv) multiplying said second image by said filtered ratio to form an adjusted image that better matches said first image as viewed on a display.

17. An imaging system as recited in claim 16, said imaging system further comprising a display monitor coupled to said controller for displaying said adjusted image.

18. An imaging system as recited in claim 16, said imaging system further comprising a storage medium coupled to said controller for storing said first image, said second image, and said adjusted image.

* * * * *